United States Patent [19]

Schnurle et al.

[11] 4,140,086
[45] Feb. 20, 1979

[54] APPARATUS FOR ADJUSTING THE COMBUSTIBLE MIXTURE OF AN INTERNAL COMBUSTION ENGINE

[75] Inventors: Hans Schnürle, Walheim; Ulrich Drews, Vaihingen-Pulverdingen; Erich Singer, Besigheim, all of Fed. Rep. of Germany

[73] Assignee: Robert Bosch GmbH, Stuttgart, Fed. Rep. of Germany

[21] Appl. No.: 826,627

[22] Filed: Aug. 22, 1977

[30] Foreign Application Priority Data

Aug. 25, 1976 [DE] Fed. Rep. of Germany ....... 2638119
Nov. 19, 1976 [DE] Fed. Rep. of Germany ....... 2652624

[51] Int. Cl.² .............................................. F02M 7/00
[52] U.S. Cl. ..................... 123/32 EE; 123/32 EA; 60/276; 60/285
[58] Field of Search ........ 123/32 EA, 32 EB, 32 EC, 123/32 EE, 117 D, 119 EC; 60/276, 285

[56] References Cited

U.S. PATENT DOCUMENTS

| | | | |
|---|---|---|---|
| 3,782,347 | 1/1974 | Schmidt et al. | 60/285 |
| 3,916,848 | 11/1975 | Schmidt | 123/32 EE |
| 3,939,654 | 2/1976 | Creps | 123/119 EC |
| 3,981,288 | 9/1976 | Wessel | 60/285 |
| 3,990,411 | 11/1976 | Oberstadt et al. | 60/276 |
| 3,998,189 | 12/1976 | Aoki | 60/276 |
| 4,015,563 | 4/1977 | Drews et al. | 123/32 EA |
| 4,019,474 | 4/1977 | Nishimiya et al. | 123/32 EC |
| 4,040,408 | 8/1977 | Kraus et al. | 123/32 EE |
| 4,073,269 | 2/1978 | Herth et al. | 123/32 EE |
| 4,075,835 | 2/1978 | Hattori et al. | 123/119 EC |

*Primary Examiner*—Charles J. Myhre
*Assistant Examiner*—R. A. Nelli
*Attorney, Agent, or Firm*—Edwin E. Greigg

[57] ABSTRACT

An apparatus for use in association with a fuel mixture preparation system for an internal combustion engine in which the output signal from an oxygen sensor located in the exhaust system is used to provide closed-loop control of the mixture ratio supplied by the mixture preparation system. The apparatus includes a principal comparator in which the sensor signal is compared with a reference value and a subsequent integrator which supplies correcting signals to the mixture controller. A special circuit between the principal comparator and the integrator can delay the signal transmission between these two elements in one direction of change, thereby causing an effective shift of the point of operation of the control loop to a different point in the sensor output curve, to compensate for aging, etc. The feedback branch of the integrator includes circuitry which effectively provides two different constants of integration to enhance smooth running at low engine speeds and to improve the control response at high engine speeds. The invention may be used with any kind of mixture preparation system, e.g., carburetors, intermittent injection systems and continuously acting injection systems.

27 Claims, 4 Drawing Figures

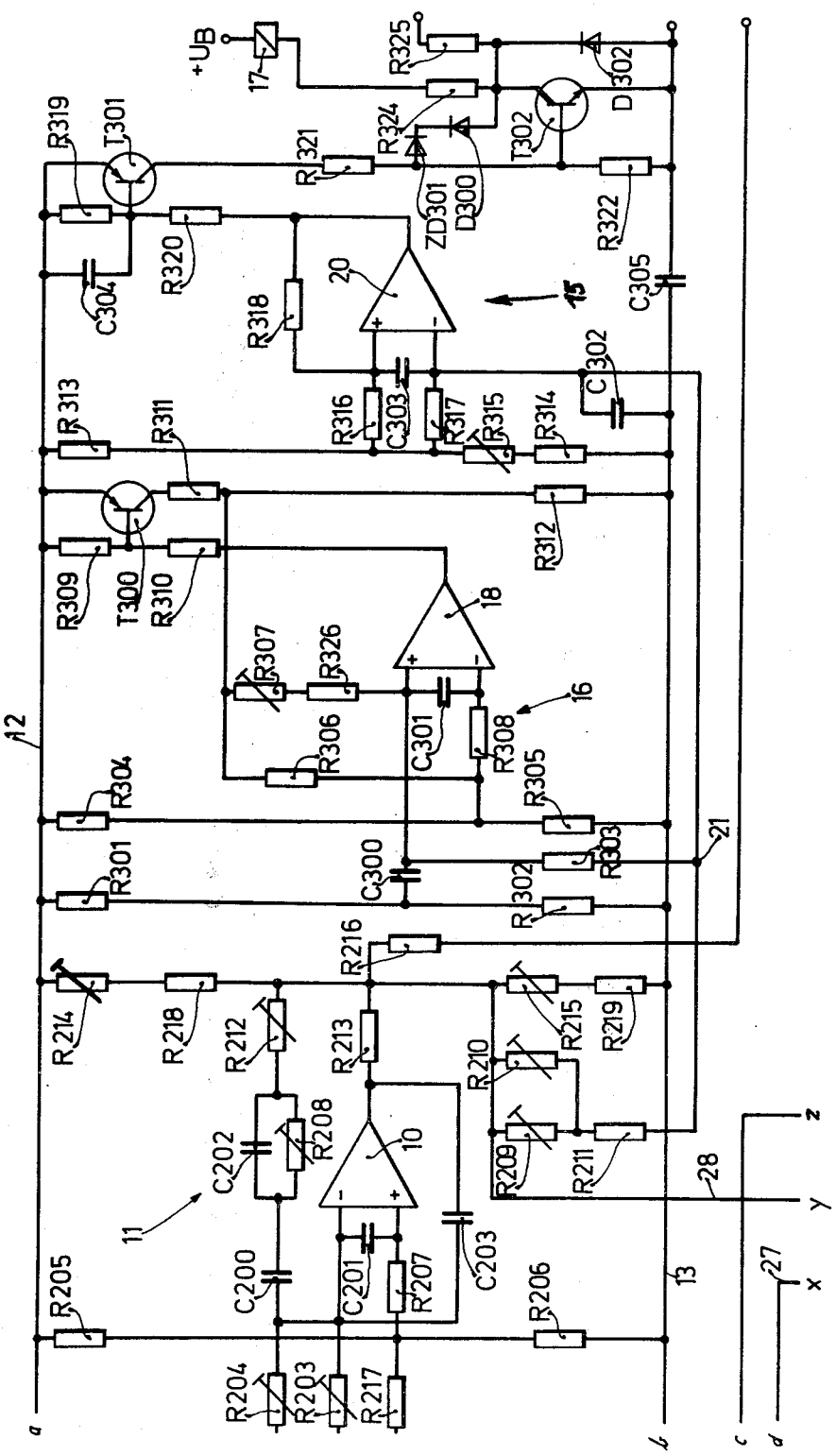

APPARATUS FOR ADJUSTING THE COMBUSTIBLE MIXTURE OF AN INTERNAL COMBUSTION ENGINE

BACKGROUND OF THE INVENTION

The invention relates generally to an apparatus for controlling the operational fuel-air mixture fed to an internal combustion engine. More particularly, the invention relates to an apparatus for controlling the operational mixture on the basis of a variable derived from the prevailing exhaust gas composition of the engine. This variable is transduced by a socalled oxygen or λ sensor which is located in the exhaust system of the engine and which generates a signal that permits deductions regarding the composition of the fuel-air mixture fed to the engine with respect to relative richness or leanness. The adjustment of the mixture on the basis of the λ sensor signal is superimposed on a basic control signal derived from signals related to engine speed (rpm) and the air flow rate, on the basis of which a fuel metering device, for example a carburetor, or intermittent or continuously injecting fuel injection systems provide fuel to the engine, preferably through electromagnetic injection valves. The invention also relates to systems in which the fuel guantity is derived from engine speed and air flow rate and is supplied continuously in dependence of a control pressure. The fuel control system includes a circuit which generates a reference voltage which is to be compared with the sensor signal in a comparator circuit behind which is connected an integrating circuit which forms the correction signal for changing the fuel quantity on the basis of exhaust gas composition.

OBJECT AND SUMMARY OF THE INVENTION

It is a principal object of the present invention to improve a known apparatus of the type described above in such a way as to attain the following results, among others: a reduction of the number of required circuit elements; the capability of connecting the λ sensor to the system without the interposition of transistors and the like for shifting voltage levels; providing the capability of changing the integration constants of the integrating circuit so as to adapt the system to a variety of operational states; and to provide a circuit for shifting the value of the air factor λ at which the engine operates by changing the reference voltage in such a way that even when the sensor ages and changes characteristics its sensor signal may still be processed usefully.

These and other objects are attained according to the invention by providing a system which includes a threshold comparison circuit with an operational amplifier that receives the output from the λ sensor directly. Connected behind the first operational amplifier is a timing circuit which takes care of the above-mentioned shifting of the λ air factor and thereby permits an adaptation to the changing characteristics of the sensor. Connected behind this shifting circuit is an integrator circuit which is subject to being switched between two separate time constants. In this manner, when the engine speed (rpm) is low, the engine can be operated more smoothly, while at high and medium engine speeds the control delays are reduced. The apparatus of the invention may be employed in connection with any mixture preparation system, for example carburetors or intermittently or continuously injecting fuel injection systems.

If a continuously operating fuel injection system is used, then the output of the integrator voltage is superimposed on a sawtooth voltage from an oscillator circuit and the sum of these signals is then processed by another circuit which produces from them a square wave pulse train with variable pulse width. This output voltage is used to control and actuate a valve that determines the control pressure of the continuously injecting fuel injection system.

The main circuit blocks described above are enchanced by the association of peripheral circuits which, among other things, monitor the operational state of the sensor and switch the system over from closed-loop to open-loop control whenever the sensor is inoperative. These circuits further shift the reference voltage which is used for comparison with the λ sensor output signal and also indicate whenever the entire system has been switched over to open-loop control.

The invention will be better understood as well as further objects and advantages thereof become more apparent from the ensuing detailed description of a preferred exemplary embodiment taken in conjunction with the drawing.

DESCRIPTION OF THE PREFERRED EMBODIMENT

Figure 1:
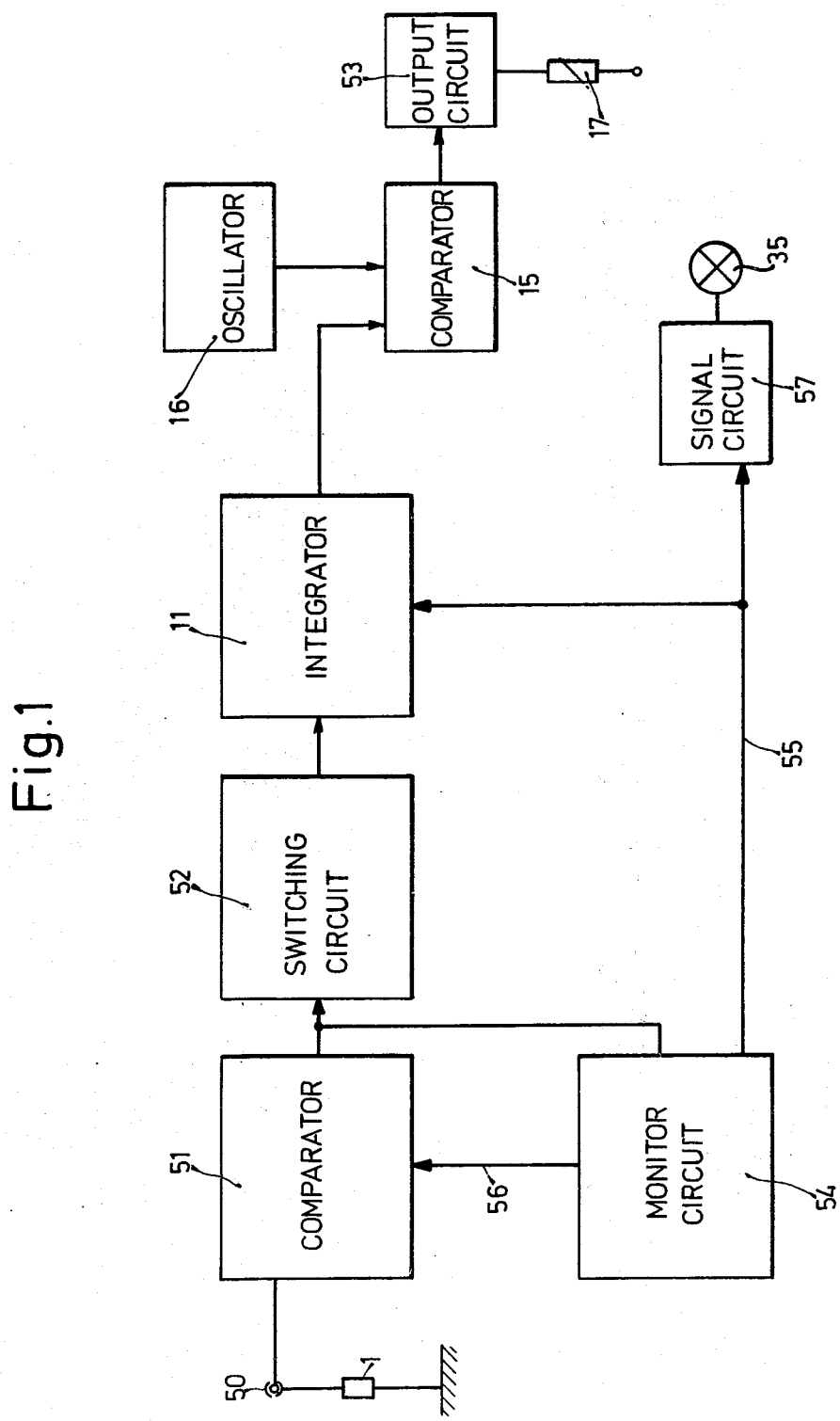
FIG. 1 is a block diagram of the main components of the fuel mixture adjustment circuit according to the invention.

Turning now to FIG. 1, there will be seen a λ sensor 1 having an output terminal 50 which is connected to an input of a comparator circuit (threshold circuit 51) which compares the λ sensor signal with a reference voltage, a so-called set-point voltage or threshold voltage and switches the output signal according to the results of the comparison. As will be explained in detail below, the reference voltage applied to the comparator 51 may be changed to adapt the output signal of the apparatus to the characteristics of the λ sensor 1.

Following the threshold or comparator circuit 51 is a circuit 52 which serves to shift the air factor λ at which the engine is operated. It includes a timing circuit which acts in such a way that when the output signal from the comparator 51 switches for example from a logical 0 to a logical 1, this change is transmitted directly whereas, when the switch occurs in the opposite direction, i.e., from a logical 1 to a logical 0, the switchover is passed on with some delay so that the overall result is an effective shift of the behavior of the system. This λ-shifting circuit 52 affects the operation of the integrating circuit 11 which follows it and which produces a continuously rising or falling signal at the output which can be regarded as a substantially direct current as compared with an oscillating wave train coming from an oscillating circuit 16. The oscillator circuit 16 provides, for example, a pulse train of a frequency of 70 Hz in the shape of a sawtooth wave which is superimposed on the output from the integrator at a comparator circuit 15. The oscillator circuit 16 may be, for example, an astable multivibrator. The two signals entering the comparator circuit 15 are processed into a rectangular output voltage whose pulse width changes according to the constitution of the integrator signal. Following the comparator circuit 15 is an output circuit 53 which actuates a valve 17 for setting the control pressure in a subsequent fuel mixture control system, not shown. The last-named four components, i.e., the elements 16, 15, 53 and 17 are required in a continuous fuel injection system for maintaining the control pressure that determines the fuel injection pressure at the injection valves in accordance with the λ output signal.

The circuit illustrated in FIG. 1 includes a monitor circuit 54 which oversees the output signal of the threshold comparator and thus checks on the operational state of the λ sensor 1. If this monitor circuit detects that the λ sensor is inoperative, it performs two tasks. Firstly, it switches the integrator circuit 11 to open-loop control via the line 55 and, secondly, it changes the threshold voltage via the line 56. The monitor circuit 54 then further engages a signaling circuit 57 which energizes, for example, a signaling lamp 35 during open-loop control so that the vehicle operator may be alerted to the temporary open-loop control of the system.

A detailed description of the circuit according to the invention will now be given with the aid of FIGS. 2a, 2a' and 2b. It will be understood that the individual circuit elements shown and discussed could be replaced by similar elements which perform the same function within the scope of the present invention. The significant aspect of the invention is not only the resulting effect of the circuit on the signal processing but not the special characteristics of each and every element shown in the merely exemplary illustration.

Figure 2A:
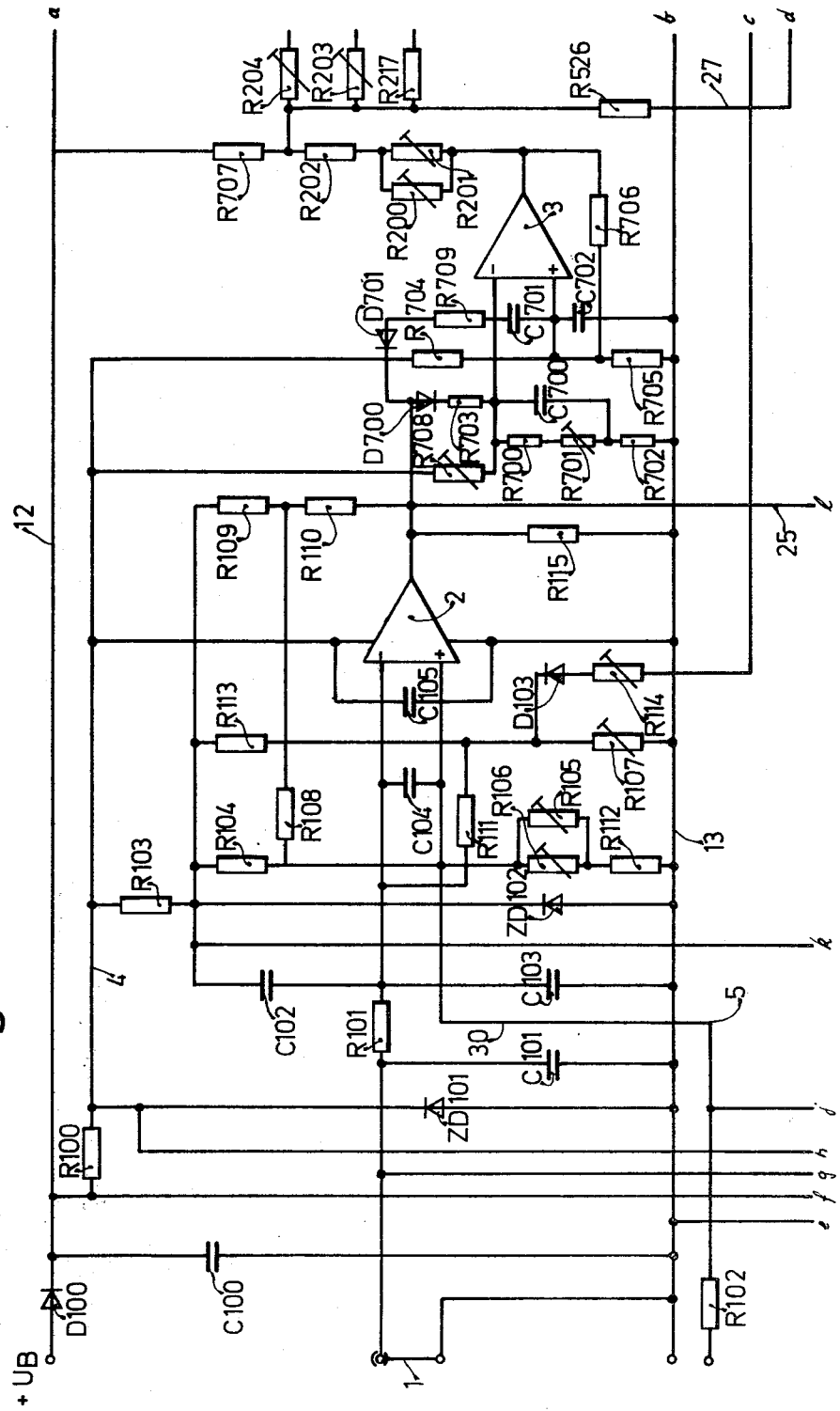
FIGS. 2a, 2a' and 2b are circuit diagrams which give a detailed illustration of the apparatus according to the invention. These three figures are practically used by being juxtaposed at their edges.

In the first of the partial circuit diagrams, i.e., the figure 2a, there is shown a λ or oxygen sensor 1 located in the exhaust system of an internal combustion engine, not shown, and capable of generating a signal related to the exhaust gas composition. Immediately following the λ sensor is a threshold comparator 2 which may be one-half of a dual operational amplifier in a single integrated circuit and of a type capable of measuring voltages near or even slightly below ground potential. Suitable circuits have been found to be those manufactured by the firm National Semiconductor or Signetics under the type designation LM258H or SE532T, respectively. The output voltage of the λ sensor 1 travels through a resistor R101 directly to the inverting input of the operational amplifier 2. This voltage is compared with a reference or set-point voltage applied to the non-inverting input. In known manner, the sensor 1 generates an output signal which is positive with respect to ground and which resembles a step function which lies at a potential of approximately 100 to 200 mV when the fuel-air mixture fed to the engine is lean (an excess of oxygen in the exhaust) and switches to a level of approximately 800 mV when the mixture is rich. In any case, the level associated with a rich mixture is definitely above that for the lean mixture. If a reference voltage is chosen the magnitude of which lies in between these two levels, then the output of a comparator such as the threshold comparator 2 will be either high or low, corresponding to a logical 1 or a logical 0. This essentially digital signal, which alternates between logical 1 and logical 0 is further processed by the fuel injection system for defining the duration or width of the pulses that are used to control fuel injection valves. In those cases where a fuel injection system that injects continuously is used, for example the so-called "K-jetronic" system manufactured by the Applicants' assignee, these signals are used for adjusting the control pressure that determines the amount of fuel injected.

Further characteristics of the oxygen sensor 1 will not be discussed inasmuch as the sensor is known per se.

The threshold or reference voltage which is applied the operational amplifier 2 is generated by an adjustable voltage divider consisting of the resistors R104, R106/R105 and R112. A connecting line 5 permits the addition of other data for forming the threshold value and these other data will be described below. Let is be assumed at the outset that the voltage of the sensor is compared with a constant reference or threshold voltage. The voltage divider receives a stabilized voltage from a Zener diode ZD102. This Zener diode is connected through a resistor R103 to the line 4 which in turn is coupled through the resistor R100 and the diode D100 to the positive power supply rail +Ub. The Zener diode ZD101 which is connected between the line 4 and ground, together with the resistor R100, serves as overvoltage protection for the integrated circuit 2 in FIG. 2a and the integrated circuit 26 in FIG. 2b by limiting any voltage peaks in the vehicle to the voltage defined by the Zener diode ZD101, i.e., to values which cannot damage the integrated circuits. The sensor voltage is filtered by capacitors C101 and C103 which are connected from both ends of the resistor R101 to ground.

The output of the operational amplifier 2 is connected to the non-inverting input via a feedback path which includes resistors R101, R109 and R110. A resistor R115 is connected between the output of the operational amplifier 2 and ground as a load resistor and permits a favorable temperature compensation.

The threshold comparator circuit so far described is followed by a circuit which is used for shifting the operation of the engine to a different value of the air factor λ and may thus be called a λ shifting circuit consisting primarily of the comparator 3 and the associated circuitry. The voltage at the non-inverting input of the comparator 3 is fixed via a voltage divider consisting of resistors R704 and R705. The output from the operational amplifier 2 reaches the inverting input of the operational amplifier through the series connection of a diode D700 and a resistor R703, the inverting input being grounded via a timing element which in the present example consists of three series connected resistors R700, R701 and R702 and a capacitor C700 connected in parallel with the first two of these resistors. A feedback resistor R706 is connected between the output and the non-inverting input of the comparator 3. The effect of this circuit is to use the capacitor C700 for a temporal shift in such a way as to displace the working point on the characteristic curve of the sensor output voltage. The reason for this shift is that when a threshold value of $\lambda = 1$ is presupposed, the sensor is not operating at the most ideal working point in its aged state. However, if the threshold voltage is shifted to a more or less ideal working point, it is necessary to undertake the above-mentioned λ shifting which is performed by holding the entire system in a state where it still indicates a lean mixture for a short period of time after the λ sensor itself has signalled a rich mixture. On the other hand, as soon as the sensor signals a lean mixture, the corresponding switchover occurs immediately without delay. This type of biased switching takes place because, when a lean mixture is indicated at the output of the operational amplifier 2, its output signal is a logical 1 or a positive voltage which causes an immediate charging of the capacitor C700 through the diode D700 to a positive voltage and a corresponding switching of the comparator output. On the other hand, if the sensor 1 indicates a rich mixture, the output of the operational amplifier 2 goes to logical 0 or to a voltage near ground which blocks the diode D700 and the switching of the comparator 3 can occur only after the capacitor C700 has been discharged through the resistors R700 and R701 which is a variable resistor to permit adjustment of the amount of λ shifting. In this type of operation, the resistors R708, R709 and the diode D701 are left out of the circuit. If these latter three elements are used but the resistors R700, R701 and R703 and the diode D700 are left out of the circuit, the circuit may be used to perform a λ shift in the direction of "lean". Such an operation may be desirable for two reasons:

1. The normal aging of the λ sensor causes the exhaust gas composition to tend in the direction of becoming richer so that the λ shift in the leaning direction may be used to roughly compensate for this aging effect.

2. In some vehicles the point of installation of the λ sensor remains relatively cool throughout the operation of the vehicle so that the internal resistance of the λ sensor remains quite high. Therefore, the input current which flows from the comparator 2 into the λ sensor causes an additional internal voltage drop with the resultt that the system tends to control a rich mixture. This effect may also become compensated for by the λ shift in the direction of "lean".

Connected directly behind the comparator 3 without interposition of any transistors or other voltage level shifting elements, is an integrator 11 shown in FIG. 2a' whose inverting input receives a voltage that alternates between logical 1 and logical 0 according to the indications of the sensor 1 and processes that input voltage into a gradually increasing or decreasing voltage, i.e., a sawtooth voltage.

The integrator assembly also includes an integrated circuit which may be the second half of the above-described dual operational amplifier of the type requiring very little input current, similar to the operational amplifier 2, which follows the sensor 1. The operational amplifier 10 within the integrator 11 continually traverses its active region and its behavior is significantly affected by the presence of two capacitors C200 and C202 in series with a resistor R212 in the feedback branch of the amplifier 10. A resistor R208 is connected in parallel with the capacitor C202. The capacitors are so chosen that the capacitance value of the capacitor C200 is substantially larger, for example 5 to 10 times as great, as that of the capacitor C202. The integrating capacitance of the amplifier is thus split into a capacitor of relatively large capacity and one of relatively small capacity coupled with a resitor R208. This combination permits the use of different integration constants and achieves the advantage of rapidly acting control with relatively small swings. When a control loop of this type is used in a motor vehicle, the drastically different engine speeds result in different response times of the overall system and it is therefore desirable if the control loop does not have very high time constants so as to permit a fairly rapid response to the controller to indications of a mixture change by the λ sensor. If the time constant is too small however and the engine is idling at very low rpm, the combined control loop including the engine and the controller may cause control oscillations. One possibility of overcoming this problem of the time constants is to permit an adjustment of the integrator output only when an injection pulse is actually being provided. In other words, the integrating system is cycled with respect to the duration of the injection pulses (ti). Another way to be used separately or in combination with the cycling is a splitting of the integrating capacitor. In that case, as will be seen the output of the integrator is initially relatively steep corresponding to a small time constant until an appropriate bucking voltage has built up on the capacitor C202 from which point the system then obeys a different time constant, corresponding to a relatively more shallow slope of the integrating signal. This analysis holds for both negative as well as positive input pulses. In the beginning, the increase of the integrator output is determined by the series connection of capacitors C200 and C202. After the capacitor C202 has charged, the further increase of the output signal is determined substantially from the values of the resistors R204 and R203 and the capacitor C200. The resistors R204 and 203 are adjustable and connected in parallel and serve to transmit the output signal from the comparator 3 of the preceding circuit which they receive through the series connection of resistors R707, R202 and R200/R201 to the inverting input of the operational amplifier 10. The non-inverting input of the same amplifier is fed at a constant voltage provided by a voltage divider circuit consisting of resistors R205 and R206 which are connected between the positive line 12 and the negative line 13. It is a significant aspect of this circuit that this same voltage divider is also used to generate the biasing voltage for the inverting input. The resistor R217 constitutes a connection from the voltage divider R205, R206 to the junction of the resistors R204/R203 and the resistors R707 and R202 in the output portion of the comparator 3. The reason for this connection is that separate temperature drifts of the two inputs of the operational amplifier 10 in the integrator are avoided and a very precise operation is possible. In spite of the relatively low impedance of the voltage divider R205, R206 and the coupling resistor R217, the signal at the non-inverting input may be affected by a switchover of the signal present at the inverting input and this may lead to sudden changes in the output voltage. Such sudden changes may sometimes be acceptable but they may also be eliminated with the aid of the adjustable resistor R212 in the feedback branch which is provided primarily for this purpose. This resistor R212 insures a certain amount of amplification at the time the input signal switches so that any sudden change in the output voltage due to coupling via the resistor R217 will occur at first in the original direction of integration and will be compensated or even over-compensated. In order to suppress any tendency to oscillations due to this increase of amplification at high frequencies, there is further provided a relatively small capacitor C203 connected between the output and the inverting input of the operational amplifier 10.

The output signal from the integrator may be used directly to influence, i.e., adjust, for example the duration of fuel injection control pulses whose basic value is derived from engine speed (rpm) and aspirated air flow. In a preferred embodiment, the previously described circuits are followed by a block which processes the integrator output signal and makes it useable for a fuel injection system which injects fuel continuously, such as the previously mentioned "K-Jetronic" fuel injection system developed and owned by the Assignee of the present invention.

In a continuously acting injection system of this type, the variables which control the amount of fuel fed to the engine are two, namely the injection pressure which is of constant value and the value of the so-called control pressure which is used to modify the amount of fuel admitted to the injection valves. In these continuous injection systems, a movable valve is engaged by these two pressures at opposite ends so that the forces due to the two pressures oppose each other. If it is desired for example to increase the injected fuel quantity, the control fluid pressure is reduced so that an enlarged quantity of control fluid returns to the tank. Conversely, if the mixture is to be leaned out, the control pressure is increased.

In order to associate the present invention with a continuously injecting fuel supply system of this type, the electrical output signals from the integrator 11 must be transformed into a variable which can change a hydraulic control pressure. For this purpose, there is provided a comparator circuit 15 which receives the output signal of an oscillator 16 as well as the output signal from the integrator 11. The comparator circuit 15 is followed by a transistor T301, in turn connected to a Darlington transistor T302 whose collector circuit includes a valve that changes the above-discussed control pressure. In this example, one electrode of the valve is permanently connected to the positive supply voltage.

The oscillator or signal generator 16 consists of a threshold switch illustrated as a comparator 18 and an associated capacitor C300 in the non-inverting input circuit which charges and discharges periodically to produce an oscillation with a relatively low frequency which may be, for example, 70Hz in the illustrated system. One electrode of the capacitor C300 is connected to the junction of voltage divider resistors R301 and R302 and thereby receives a fixed potential. The other electrode of the capacitor C300 is directly connected to the inverting input of the comparator 18. The capacitor C300 is charged and discharged via resistors R326 and R307 which connect the capacitor to the output of the comparator 18. In the present exemplary embodiment, this path includes a transistor T300 which is provided only for voltage amplification. The transistor T300 is controlled via resistors R309 and R310 to the output of the comparator 18. The collector of the transistor T300 is connected to the negative or ground supply line via resistors R311 and R312, the junction of which is connected to the variable resistor R307. The voltage at the inverting input of the operational amplifier 18 is fixed by the voltage divider consisting of resistors R304 and R305, the junction of which is connected to a resistor R306 leading to the collector of the transistor T300 for the purpose of generating hysteresis and a sufficiently wide voltage swing. Let it be assumed that, at a given time, the output voltage of the operational amplifier 18 will have the logical state 0, then the transistor T301 will be conducting and the capacitor C300 is charged substantially as determined by the resistors R307 and R326 to some positive voltage. If this voltage exceeds the voltage applied to the inverting input of the comparator 18, then this comparator will change its output from logical 0 to logical 1 and will thus block the transistor T300. Consequently, the capacitor C300 is discharged via the resistors R307 and R316 until the comparator 18 switches back to a low output. This circuit only makes use of the exponential charging and discharging voltage of the capacitor C300 which is passed via resistor R303 to a comparator 15 which includes a comparator circuit 20 as well as the above-mentioned transistor T301. The presence of the divider resistors R301 and R302 provides a very good linear translation of the exponential sawtooth voltage on the capacitor C300 into a duty cycle or pulse width ratio. They also tend to reduce the susceptibility of the oscillator to spurious voltages. A linearization of this type is required to permit the mixture adjustment speed in for example a "K-Jetronic" system, to be independent of the instantaneous status of the integrator 11. By appropriate choice of the values of the resistors R313, R315 and R314 which constitute a voltage divider which acts on the inputs of the comparator 20 via resistors R316 and R317, it is possible to produce at the output of the comparator 20 a rectangular voltage with the keying ratio or pulse width ratio of 1:1, i.e., a symmetric pulse train. Superimposed on the signal from the capacitor C300 at the inverting input of the comparator 20 is the integrator output voltage from the operational amplifier 10 which is received via resistors R209, R210 and R211. Due to this superposition, the output of the transistor T301 controlled by the comparator 20 consists of pulses of constant frequency but variable width which depend on the integrator voltage and thus ultimately depend on the output signal from the oxygen sensor 1 which responds to the composition of the exhaust gas. It might be observed that the output voltage of the operational amplifier 10 which is the heart of the integrator 11 could be considered as a D.C. potential when compared for example to the frequency from the generator 16 and it is this D.C. potential whose varying value changes the duty cycle or pulse width.

The output stage of the circuit is formed by connecting the base of the transistor T301 to the output of the comparator 20 via resistors R320 and R319 and by connecting the collector of the transistor T301 to the base of a Darlington transistor T302 via resistors R321 and R322 connected as shown. When the transistor T301 conducts, so does the transistor T302 and the valve 17 and the collector circuit of the Darlington transistor T302 is opened for the duration of the prevailing pulse which occurs at a frequency of for example 70 Hz. This frequency is sufficiently high to prevent a pumping effect in the control pressure applied to the fuel metering system due to the mechanical integrating effect of that system. In this manner, the fluid control pressure which determines the amount of fuel fed to the engine is changed by the keying ratio or pulse width ratio of the voltage formed at the output of the comparator 20 and thus ultimately based on the output signal from the λ sensor 1.

An RC member is connected in parallel with the collector emitter path of the transistor T302 to protect it from the high shut-off voltage peak induced by the inductance of the valve 17. The peak voltage is limited however by a Zener diode ZD301 connected between the collector and base of the output transistor to the sum of the Zener voltage plus the base emitter voltage of the transistor. This manner of limiting the valve shutoff peak has the advantage of permitting a shorter and more precisely defined closing time of the valve and these times can be appreciable at the relatively high frequency of actuation of for example 70Hz.

The output transistor T302 is protected against a reversal of polarity by a diode D302 and a similar purpose is served by the diode D402 in the collector circuit of the transistor T401 to be described below as well as by the diode D100 at the input side of the controller electronics.

Figure 2B:
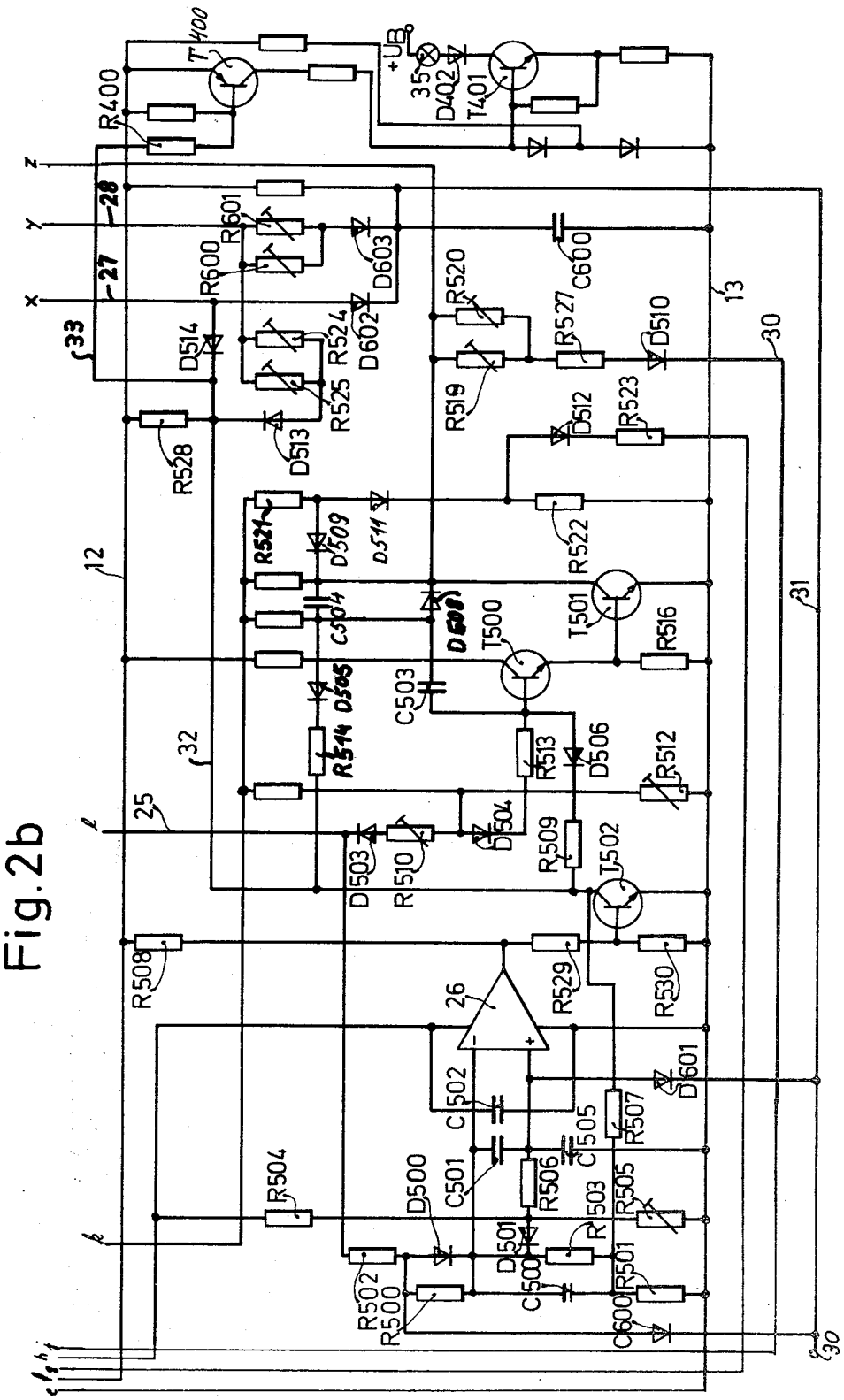

The invention further includes peripheral circuitry illustrated in FIG. 2b and substantially responsible for switching the system over from closed-loop to open-loop control whenever a λ sensor is found to be non-operational and further for shifting the reference value with which the λ sensor signal is compared whenever the sensor happens to be operating in critical domains in which its output signal is no longer ideal.

A further peripheral circuit is used to monitor the operational readiness of the sensor based on the behavior of the output from the operational amplifier 2. Normally, that output is a cyclic variation between a low and high logical value whenever the sensor operates correctly. If this cyclic variation does not occur over an extended period of time, it must be assumed that the system no longer operates correctly and the closed-loop control process described above must be abandoned.

In order to monitor the operational readiness of the λ sensor, the output signal from the operational amplifier 2 is passed through a line 25, a relatively low valued resistor R502 and a diode D500 to a capacitor C500 which is charged to positive voltages via a conducting diode D500 whenever the output of the operational amplifier 2 is high, i.e., at logical 1. The junction of the capacitor C500 and the diode D500 is connected to the inverting input of a further comparator 26 whose non-inverting input receives a constant voltage via a voltage divider consisting of a resistor R504 and an adjustable resistor R505. When the λ sensor is inoperative, for example due to low temperature or a defective supply cable, the capacitor C500 can no longer be charged via the line 25 and it is gradually discharged. After a predetermined length of time, designated as the monitoring time Tu, the comparator 26 senses the failure of the sensor and renders a subsequent transistor T502 conducting via resistors R529 and R530. The collector resistor R528 of the transistor R502 then pulls the inputs of the integrator 10 toward negative values via the diode D514 and the resistor R526 in the line 27 leading to the input of the integrator 10. At the same time, a suitably chosen voltage reaches the adjustable voltage divider circuits composed of resistors R209/R210 and R211 in the output of the integrator 10 via the diode D513 and the resistors R525 and R524 and the connecting line 28 so that a suitably stepped-down average potential is obtained which is valid during the incipient openloop control phase.

The same overall effect is obtained if, for example, the gas pedal of the engine is actuated to enter the region of full-load operation, for, in that case, the input contact 30 is connected to ground, i.e., a state equivalent to the logical state 0, which affects the lines 27 and 28 in the integrator circuit via connecting lines 31 and the diodes D602 and D603. As before, the inputs of the integrator are pulled in the direction of negative voltage through the diode D602 and the resistor R526 so that the integrator moves to its upper stop while the resistors R600 and R601 take care of a sensitive adjustment and set a desired keying ratio (pulse width ratio) for this operational state of the engine. Thus, when the engine enters the full-load operational domain, there occurs a similar switch from closed-loop to open-loop control as occurs when the monitoring circuit centered about the comparator 26 indicates an inoperative sensor. However, if for any reason, the two separate states of full-load and lacking sensor readiness occur at the same time, they should not be permitted to exert a double effect on the keying ratio of the output frequency as determined by the potential from the integrator, and, to prevent such a double action, the sensor monitoring circuit is disabled during full-load engine operation. In such a case, the diode D601 whose cathode is grounded at full-load via the input contact 30, causes the voltage at the non-inverting input of the comparator 26 to remain below that present at the inverting input which is equal to the voltage on the capacitor C500. The capacitor voltage is held by the conducting diode D501 to a value defined by the voltage dividing ratio of the resistors R504 and R505 at some point during the discharge process of the capacitor. Therefore, during full-load, the comparator 26 is unable to indicate a non-operational sensor even if the output voltage from the operational amplifier 2 no longer changes.

It should be noted that the transistors which are used in the illustrated exemplary embodiment as being connected behind the intergrated circuits, for example behind comparators 18 and 26, serve for current amplification only and may be dispensed with if these integrated circuits are themselves so embodied as to be capable of generating the required currents for controlling peripheral circuitry and downstream electronics.

A further circuit which forms part of the invention but is known per se is connected through the connecting line 30 to the junction of the resistor R104 and the parallel resistors R106 and R105 and shifts the threshold voltage supplied to the non-inverting input of the operational amplifier 2 with which the sensor voltage is compared. This shift in the threshold or reference voltage is required to permit a changeover from open-loop to closed-loop control during the warm-up phase of the λ sensor at a point when the sensor signal is small but recognizable even though the sensor is not in its normal and optimum temperature region. This circuit for shifting the reference threshold includes two transistors T500 and T501 which, together with the capacitor C503 form a so-called Miller integrator which is controlled by the operational amplifier 2 through the connecting line 25 and the diode D503 in series with the resistor R510. There is further provided a voltage divider circuit consisting of the resistors R511 and R512, the divided potential of which is applied via the diode D504 to the input of the Miller integrator (the base of the transistor T500) in such a way that, when the transistor T502 blocks at the end of the open-loop control phase, the output voltage of the Miller integrator as taken from the collector of the transistor T501 continually decreases in accordance with the voltage at the voltage divider R511, R512 and the ratio of the resistor R513 to the capacitance of C503. However this occurs only if the diode D503, which is connected in series with the resistor R510, is blocked when a positive voltage is present at the outut of the operational amplifier 2. When this diode D503 conducts, i.e., when the output of the operational amplifier 2 is low, at logical 0, then the diode D504 blocks and the Miller integrator stops in its instantaneous position. At the onset of the open-loop control phase, when the transistor T502 conducts, the output voltage of the Miller integrator increases in accordance with the value of the resistor R509. The collector voltage of the transistor T501 is placed on the threshold input of the operational amplifier 2 through the resistors R519 and R520 which are connected in parallel and the series connection of the resistor R527 and the diode D510. During the open-loop control phase, the λ-sensor receives additional current without requiring a separate transistor for this purpose. The source for this additional current is the voltage divider consisting of resistors R521, R522 and the diode D511. The additional current is fed to the sensor through resistor R523 and the diode D512. Due to the presence of the diode D509, the additional current is shut off only after the previously raised threshold value has been decreased; in the exemplary embodiment shown, to one-half of its original value. If the diode D509 is replaced by a resistor of suitable size, and if the resistor R521 is left out, the additional current is shut off immediately after termination of the open-loop control phase.

The voltage divider consisting of resistors R514 and R517 and the diode D505 in connection with the diode D508 makes it possible to shift the threshold by an amount given by the ratio of resistors R514 and R517 immediately after the termination of the open-loop control phase and to cause its gradual decline from that value in a relatively slow manner and in accordance with the integration time constant. This type of change is required because the sensor may heat up faster and thus the additional voltage drop across the λ sensor which is due to the decreasing internal resistance at increasing temperature may decrease faster than the previously raised threshold value is being reduced. In such a situation, the input comparator (the threshold comparator assembly 2) would indicate a lean mixture for an excessively long period of time and the integrator 11 would continue to run in the direction of the positive voltage $+U_B$. In the closed-loop control phase, the Miller integrator consisting of the transistors T500 and T501 is over-controlled so that the diode D510 blocks and the threshold adjustment does not take place. The circuit includes some other constituents but their discussion is not required for an understanding of the function of the circuit and will thus not be given.

The apparatus according to the invention finally includes another circuit group which serves for energizing an indicating lamp or some other alarm which signals the operational status of the λ sensor. Whenever the overall system is in open-loop control, i.e., when the transistor T502 conducts and the line 32 is substantially at ground potential, the transistor T400 is actuated via the line 33 and the resistor R400; it becomes conducting and causes conduction of the transistor T401 whose collector circuit includes an indicating or signalling lamp 35. In addition, a diode D600 is connected between the full-load contact 30 which switches to logical 0 when actuated and the junction of the resistor R502 and the diode D500. When the diodes D601, D602 and D603 are eliminated, the diode D600 lowers the anode potential of the diode D500 during full-load, causing the latter to block and thus to prevent a further charging of the capacitor C500. At the same time, the capacitor C500 discharges via the resistor R500 and the diode D600 to ground; in that case, the full-load status occurs only after the expiration of a delay, namely the sensor monitoring delay, which is the time required by the capacitor C500 for discharge. During this period, a monitoring of the λ sensor is impossible because, as already explained, the diode D500 remains blocked and the capacitor C500 can be charged up only after the expiration of the full-load phase. In that state of operations, the previously mentioned indicator lamp is lighted to show the presence of the open-loop control phase.

The above described circuit according to the present invention performs with high precision and the direct actuation of the integrated circuits, i.e., the operational amplifiers and comparators, permits the embodiment without supplemental transistors. The specific circuitry also compensates for the ever-present temperature drifts in such a way that the overall system is able to perform according to high requirements of accuracy.

A further special feature of the circuit is that the input circuit for the inverting input of the operational amplifier 2 to which the sensor output is connected is coupled to a voltage divider consisting of the resistors R113 and R107 whose junction is connected through a resistor R111 to the inverting input of the operational amplifier 2. The input current to the operational amplifier 2, which is in any case very small, is compensated via the resistor R111. By connecting the other side of the resistor to a raised potential, it is possible to make its value low. The junction of the resistors R113 and R107 is further connected through the diode D103 and an adjustable resistor R114 to the output of the previously described Miller integrator consisting of the transistors T500 and T501 so that, in the open-loop control phase, the voltage divider potential from the resistors R113 and R107 is additionally raised to insure that no current is taken from the oxygen sensor. However, the input currents to the operational amplifiers used are actually so small that the circuit which comprises this voltage divider R113/R107, the resistor R111 and the connection to the peripheral resistor-diode combination D103 and R114, may also be dispensed with.

The present invention is suitable to be used in association with any kind of mixture preparation systems, for example carburetors, fuel injection systems, and the like. If carburetors are used, the throttle flow cross-section for feeding fuel to the induction tube may be changed, but it is also possible to alter other regions of operation of a carburetor of any known construction so long as the mixture ratio of the air-fuel mixture is changed in dependence on the output signal of the λ sensor.

The invention is particularly well suited for controlling the exhaust gas recycle rate in mixture preparation systems, for regulating bypass conduits or for the supplementary adjustment of the duration of fuel injection control pulses in fuel injection systems, for example by engaging the rate multipliers of such systems. In general, a λ oxygen sensor and the circuitry described by this invention to be used in association therewith may be employed in any system and apparatus which combust fuel and receive fuel by aspiration under vacuum or by pressurized delivery.

The foregoing relates to a preferred exemplary embodiment of the invention, it being understood that variants thereof are possible within the spirit and scope of the invention. What is claimed and desired to be secured by Letters Patent of the United States is:

1. An apparatus for supplying a combustible mixture to an internal combustion engine, said apparatus including oxygen sensor means disposed in the exhaust system of said engine to generate a sensor signal;

means for metering and delivering fuel to said engine including an electronic means for adjusting the composition of said combustible mixture, said electronic means including a principal comparator for comparing said sensor signal with a reference value and an integrator connected behind said principal comparator for generating an integrated electrical signal for use by said means for metering fuel, and wherein the improvement comprises:
a shifting circuit, connected between said principal comparator and said integrator in said electronic means, for delaying the transmission of a change in the output potential of said principal comparator to said integrator for at least one of the two possible directions of change of said output potential, said shifting circuit including a comparator (3) and a voltage divider circuit providing to said comparator (3) a reference voltage and further including timing means triggered by the output from said principal comparator and connected to a second input of said comparator (3).

2. An apparatus as defined by claim 1, wherein said integrator includes elements for providing two distinct integrating time constants; whereby said integrator attains rapid response and prevents control oscillations.

3. An apparatus as defined by claim 1, wherein said timing circuit associated with said comparator (3) is connected to the inverting input of said comparator (3) and is so constituted that when an output signal from said principal comparator indicates a relatively rich fuel-air mixture on the basis of said sensor signal, said timing circuit delays the transmission thereof to said comparator (3).

4. An apparatus as defined by claim 1, further including two resistors connected in series and together connected in parallel with a capacitor, the combination of said resistors and said capacitor being connected to the inverting input of said comparator (3) and said combination of resistors and said capacitor being connected in series with a diode (D700) which is connected to the output of said principal comparator for the transmission of positive voltages.

5. An apparatus as defined by claim 1, wherein said principal comparator includes an operational amplifier with two inputs, both of said inputs being connected directly to the output of said λ sensor, and said operational amplifier in said principal comparator being an integrated circuit capable of processing input voltages near zero differential volts.

6. An apparatus as defined by claim 1, wherein said integrator includes feedback elements providing two different integrating time constants.

7. An apparatus as defined by claim 6, wherein said feedback circuit of said integrator includes the series connection of a capacitor (C200) of relatively large capacitance and a second capacitor (C202) of relatively smaller capacitance the latter of which being in parallel with an adjustable resistor (R208).

8. An apparatus as defined by claim 1, wherein, for the purpose of compensating temperature drifts, both inputs of said integrator are connected to a voltage divider circuit (R205, R206), the junction of which is connected through further resistors to said inputs of said integrator.

9. An apparatus as defined by claim 8, wherein the feedback branch from the output of said integrator to the input of said integrator includes a resistor (R212) for the purpose of signal decoupling.

10. An apparatus as defined by claim 1, wherein said means for metering and delivering fuel to said engine is a continuously injecting fuel supply system and wherein said electronic means further includes an oscillator (16) the output of which is superimposed on the output of said integrator and wherein said electronic means further includes a third comparator (15) which receives the output from said integrator and said oscillator and generates a rectangular output voltage whose keying ratio (pulse width ratio) is dependent on said sensor signal from said oxygen sensor.

11. An apparatus as defined by claim 10, wherein said oscillator circuit includes a capacitor (C300) and means for charging and discharging said capacitor (C300) in exponential manner and further includes a comparator (18), the output of which causes the charging of said capacitor (C300) in one output status until the voltage on said capacitor (C300) which is fed to the input of said comparator (18) causes said comparator (18) to switch over to its other status thereby causing the discharge of said capacitor (C300).

12. An apparatus as defined by claim 11, wherein said oscillator circuit includes a voltage divider circuit (R301, R302), the junction of which is connected to one electrode of said capacitor (C300) while the other electrode of said capacitor (C300) is connected to the non-inverting input of said comparator (18) and wherein said oscillator circuit further includes a transistor (T300) whose base is connected to the output of said comparator (18) and whose collector circuit includes at least one resistor connected to said comparator (18) for controlling the charging and discharging rate of said capacitor (C300).

13. An apparatus as defined by claim 12, wherein said electrode of said capacitor (C300) which is connected to the non-inverting input of said comparator (18) is also connected via resistors to the output of said integrator and is further connected to one input of a comparator (20) whose other input receives a predetermined voltage from a voltage divider circuit including resistors (R313, R315, R314) which form a reference voltage; whereby when the sawtooth-like output voltage from said oscillator circuit crosses the level of said reference voltage, it changes the output from said comparator (20) and thereby changes the duty cycle of the pulses from said comparator (20), said pulses being used to control a valve which determines the control pressure in said continuously injecting fuel supply system.

14. An apparatus as defined by claim 1, including a monitor circuit for monitoring the operational status of said oxygen sensor and including a timing circuit for detecting changes in the output voltage from said oxygen sensor within a predetermined period of time.

15. An apparatus as defined by claim 14, wherein said monitor circuit includes a comparator (26) one input of which receives a reference voltage from a voltage divider circuit including resistors (R504, R505) and the other input of which is associated with a timing circuit connected to the output of said principal comparator (2).

16. An apparatus as defined by claim 15, wherein said timing circuit is connected to the inverting input of said comparator (26) and includes the parallel connection of a capacitor (C500) and a resistor (R503) both connected in series with a diode (D500); whereby after said capacitor (C500) has discharged and when a negative output voltage from said principal comparator blocks said diode, said comparator (26) switches states and opens the control loop in said integrator by acting on further circuit means including transistors, diodes and resistors.

17. An apparatus as defined by claim 16, further comprising a control circuit connected to said comparator (26) for actuating signalling means when said integrator changes from closed to open-loop control.

18. An apparatus as defined by claim 17, including means for sensing full-load engine operation and for generating a voltage near ground during full-load operation, and including adjustable elements (D602, D603, R600, R601) through which said voltage near ground is fed to said integrator and to said comparator (26) in said monitor circuit to thereby prevent said monitor circuit from indicating open-loop control during full-load engine operation.

19. An apparatus as defined by claim 18, wherein, as an alternative to the full-load switching as defined by claim 19, the input contact (30) is connected through a diode (D600) to said monitor circuit; whereby after expiration of the monitoring period, the whole system switches to closed-loop control.

20. An apparatus as defined by claim 1, wherein said shifting circuit includes a comparator (3) one input of which is connected to a voltage divider circuit including resistors (R704, R705) while the inverting input of said comparator (3) is connected through a variable resistor (R708) to a source of positive voltage and through a diode connected to pass negative currents to the output of said principal comparator (2).

21. An apparatus as defined by claim 1, associated with a continuously injecting means for metering and delivering fuel, including an oscillator circuit, the output of which is superimposed on the output from said integrator and fed to a further comparator (15) for producing rectangular output control pulses of variable keying ratio and wherein for the purpose of linearizing the exponential sawtooth voltage generated by said oscillator said oscillator includes an operational amplifier to the input of which is connected a capacitor (C300) the other electrode of which is connected to a voltage divider circuit including resistors (R301 and R302); whereby the rate at which the combustible mixture is adjusted is independent of the instantaneous status of said integrator.

22. An apparatus as defined by claim 21, wherein said processing circuit (15) is connected to an output circuit including an output transistor (T302) which controls a pressure control valve (17) for changing the control pressure of said continuous fuel injection system, and further including Zener diode (ZD301) connected between the collector and the base of said output transistor (T302); whereby voltage peaks generated by the closing of said valve (17) are limited.

23. An apparatus as defined by claim 22, further comprising a diode connected in parallel with the collector-emitter path of said output transistor (T302) for protection against inadvertent opposite polarity.

24. An apparatus as defined by claim 1, further comprising a voltage divider circuit (R521, D511, R522) for providing additional current to said oxygen sensor means via a diode (D512) and a resistor (R523) during open-loop control of said apparatus.

25. An apparatus as defined by claim 24, wherein the junction of said resistor (R521) and said diode (D511) is connected through a diode (D509) to the output of a Miller integrator including transistors (T500 and T501); whereby said additional current is turned off only after said reference value for said principal comparator has decreased partially.

26. An apparatus as defined by claim 24, wherein said voltage divider is composed of only said diode (D511) and said resistor (R522) and is connected to said Miller integrator via a resistor; whereby the additional current is shut off immediately after termination of said open-loop control phase.

27. An apparatus as defined by claim 1, further comprising a monitor circuit including a comparator (26) and a transistor (T502) controlled thereby and further comprising a voltage divider circuit consisting of resistor (R514), diode (D505) and a resistor (R517) for supplying a positive supply voltage to the collector of said transistor (T502) and wherein the junction of said resistor (R517) and said diode (D505) is connected to the anode of a diode (D508) the cathode of which is connected to the output of a Miller integrator consisting of transistors (T500, T501); whereby the reference voltage for said principal comparator is changed abruptly after termination of open-loop control by an amount defined by the ratio of the resistors (R514, R517) and thereafter increases slowly at a rate determined by the time constant of said integrator.

* * * * *